United States Patent [19]
Barrus et al.

[11] Patent Number: 5,465,291
[45] Date of Patent: Nov. 7, 1995

[54] APPARATUS FOR ORDERING FROM REMOTE LOCATIONS

[76] Inventors: John Barrus, 60 Wadsworth St., Cambridge, Mass. 02042; Krisztina Holly, 23801 Ladrillo St., Woodland Hills, Calif. 91367; Michael Cassidy, 11910 Enid Dr., Patomac, Md. 20854

[21] Appl. No.: 369,583

[22] Filed: Jan. 6, 1995

Related U.S. Application Data

[63] Continuation of Ser. No. 80,584, Jun. 24, 1993, abandoned, which is a continuation of Ser. No. 685,843, Apr. 16, 1991, abandoned.

[51] Int. Cl.[6] .................................................. H04M 1/64
[52] U.S. Cl. ........................... 379/67; 379/91; 379/97; 379/102; 235/381; 235/375
[58] Field of Search .................... 379/67, 88, 91, 379/97, 102, 104; 235/381, 375, 462; 364/401, 412

[56] References Cited

U.S. PATENT DOCUMENTS

| | | | |
|---|---|---|---|
| 4,654,482 | 3/1987 | DeAngelis | 379/95 |
| 4,734,858 | 3/1988 | Schlatly | 379/91 |
| 4,782,513 | 11/1988 | Krueger | 379/100 |
| 4,797,913 | 1/1989 | Kaplan | 379/91 |
| 4,799,254 | 1/1989 | Dayton | 379/96 |
| 4,817,129 | 3/1989 | Riskin | 379/88 |
| 4,897,865 | 1/1990 | Canuel | 379/91 |
| 4,922,522 | 5/1990 | Scanlon | 379/88 |
| 4,937,853 | 6/1990 | Brule et al. | 379/96 |
| 4,975,948 | 12/1990 | Andresen et al. | 379/355 |
| 4,984,155 | 1/1991 | Geier et al. | 379/90 |
| 5,119,295 | 6/1992 | Kapur | 364/412 |
| 5,216,228 | 6/1993 | Hashimoto | 235/375 |

OTHER PUBLICATIONS

Patent Application Location & Monitoring (PALM) User's Manual Chapter 1 and 2. Sept., 1989.

*Primary Examiner*—Jeffery A. Hofsass
*Assistant Examiner*—Fan Tsang
*Attorney, Agent, or Firm*—Rines and Rines; Shapiro and Shapiro

[57] ABSTRACT

The present invention relates to an improved interactive store or other central location-remote telephone home, office or other user telephone terminal system and technique for enabling users to order items from the central location with the aid of machine-readable apparatus at the user terminal, preferably a bar code reader, operated by the user in scanning pre-prepared bar codes descriptive of the items to be ordered, and the signals of which are directly converted to DTMF tones transmitted over the telephone to the central location where they are recognized and stored, with voice confirmation describing the ordered item automatically sent back over the telephone to the user.

8 Claims, 10 Drawing Sheets

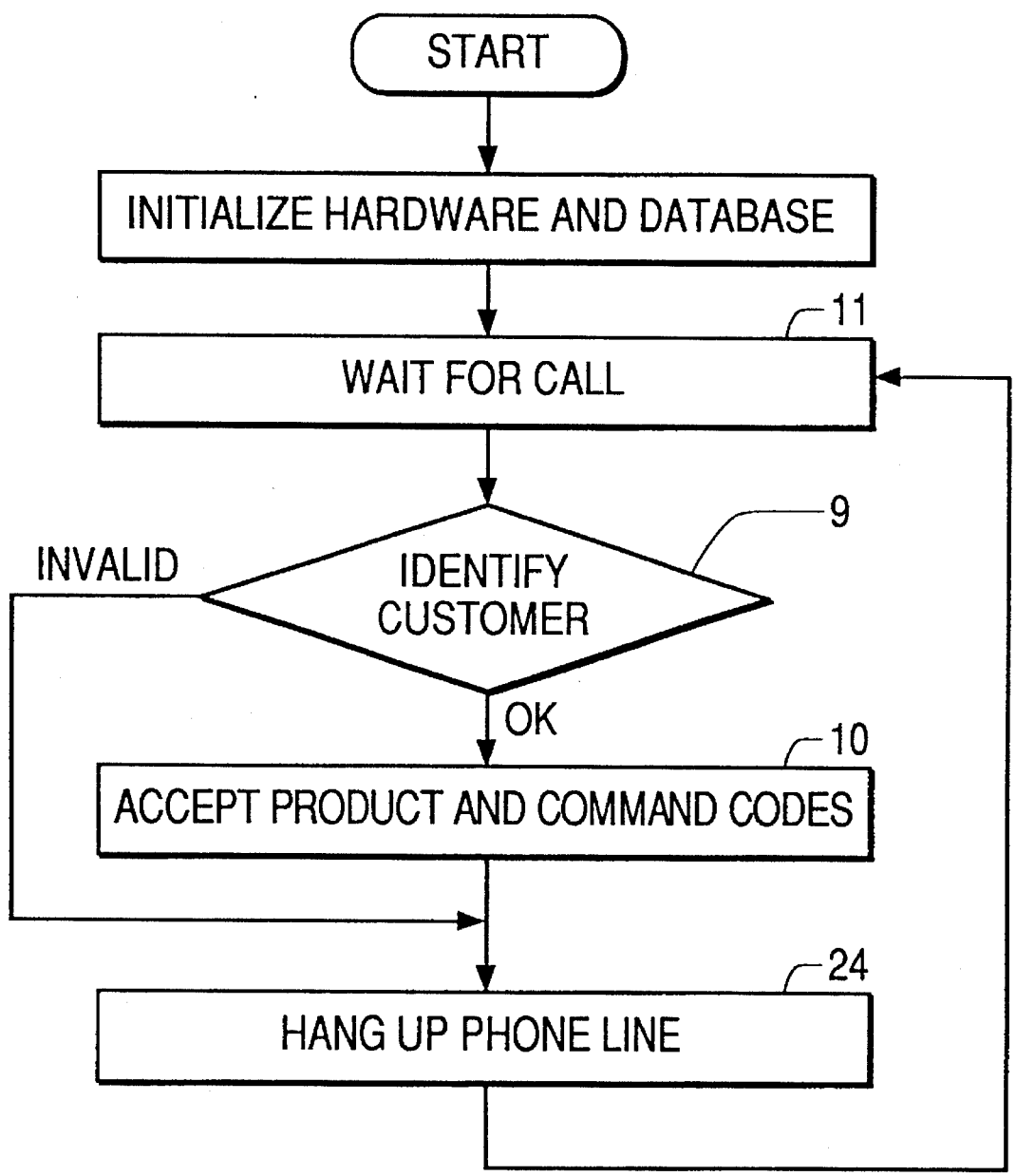

APPARATUS FOR ORDERING FROM REMOTE LOCATIONS

This is a continuation of application Ser. No. 08/080,584 filed Jun. 24, 1993, which is a continuation of application Ser. No. 07/685,843 filed Apr. 16, 1991, both now abandoned.

The present invention relates to methods of and apparatus for enabling the remote ordering of merchandise and/or services from purveyors of the same, such as home terminals for use over the telephone with remote stores and the like. The term "telephone", as used herein, is intended generically to embrace telephone networks interconnected by lines, fiber optics, radio and other communication links; and the word "store", generically to embrace a central location having the required inventory and/or a data base relating to the same for enabling servicing of the customers.

BACKGROUND OF THE INVENTION

Most retail stores keep their inventory and pricing information in a computer to expedite the selling of inventory and restocking process. Until recently, this information was only accessible to the cash registers and store personnel. Given the right interface, customers could interact with the information in the store computer to order items that are sold by the store and that are in stock, and also find out the current price of those items.

Recently, Sears and IBM have teamed up to create software, called "Prodigy", that allows people using a home computer to connect with a database maintained by several types of stores, including grocery stores and airlines, to determine what items are available and at what price. If interested, the users can then place an order with that store and have the item delivered, having the cost of that item charged to their credit cards.

In order to use this method of purchasing merchandise, however, the user must have a personal computer (IBM/PC/XT/AT or compatible or Apple Macintosh computer, for example), a modem, and a copy of the software and accompanying manuals. Using the modem and software, the user may connect to the "Prodigy" computer network which maintains a merchandise and pricing database, through the phone lines coming into the home. The user is provided with a series of menus for determining what items are available for purchase. When the selections are made, the user indicates the desire to order the items, and a delivery schedule is arranged. Non-perishable items are often sent through the mail, while perishable goods such as groceries are only available in areas which have a sponsoring grocery delivery service within range.

Although this approach to ordering and delivering merchandise is effective, it is inaccessible to many because of the expensive initial investment for the computer system and associated hardware. The on-line service also charges a monthly usage fee to offset the cost of providing all of the other services offered by the server. Training is another disadvantage, because people who do not use computers will take a while to understand how computers work, and many people feel computers to be foreboding.

The software used to access "Prodigy" or similar systems is graphically based in order to make it easier to use; but this makes it inherently slow on inexpensive computers, and even expensive computers experience delays resulting from the amount of information that has to be sent over the phone lines. The ordering process, moreover, involves the user deciding upon what is wanted by wading through many computer screens of offerings, though with on-line indices.

Finally, because the merchandise information and pricing information is kept centrally at the server, instead of at the merchant's place of business, there is no real-time pricing or inventory information, and such must be transferred from the computer at regularly scheduled intervals.

Another prior proposal involves dedicated home merchandise ordering terminals for allowing a user to order merchandise remotely, as in U.S. Pat. No. 4,654,482. The device employs a terminal, with a bar code reader, that is connected to the phone lines in the home. Catalogs or other printed materials that contain merchandise information in both human readable and bar code form are used. The bar code wand connected to the merchandise ordering terminal is passed over the bar codes, and the terminal recognizes the bar code and converts it into merchandise information. The merchandise information, including price, is stored in memory in the terminal. The scanned information is kept as a list in memory that will later be transmitted to the remote location (retail merchant) for ordering.

The terminal in this type of system consists of a bar code reader wand, some processing electronics, including a central processing unit (CPU), some memory for temporary storage, some memory to store merchandise recognition information, a modem for communicating with the merchant's computer, a display and some buttons. The CPU monitors the bar code input and translates the bar code signals into merchandise information using data stored in the memory of the terminal. The order is stored in memory until the operator of the terminal places the order by dialing the phone number of the store. Using the modem, the terminal transmits the order information to the computer at the merchant's location. The order is interactive, with the store verifying that each item is in stock and displaying the current price of the item through the terminal. Using the buttons on the terminal, the operator indicates his or her willingness to pay the price indicated, by pressing either the "yes" or "no" button. Other information can be sent to the terminal from the merchant for display to the user.

While using the bar code to input the order data is a good way to save time and reduce errors, there are, however, difficulties with such a scheme, residing primarily in the prohibitively expensive home unit, which limits the number of people that would be able to participate, including the disabled and the elderly, and the high degree of complexity in the interface of such a device.

The present invention, on the other hand, provides a low-cost ordering terminal of different philosophy and construction that overcomes many of these problems associated with the aforementioned devices. While a bar code wand is most useful for reducing errors associated with inputting data to an ordering terminal, the information connected to the bar code reader is not very useful if it is out of date. In accordance with the invention, when a bar code reader is employed, as preferred, such is directly connected with the database containing up-to-date inventory and price information. The use of modems, moreover, is completely obviated by connecting the bar code wand preferably to a Dual Tone Multiple Frequency (DTMF) generator, such that the printed bar codes are translated into corresponding DTMF tones representing the item data-to-be ordered as contained in the bar code, and transmitted over the telephone to the remote location. Any receiving device that can recognize such tones can provide database access to the bar code user.

While, as before stated, bar code reading has been used in other systems including, also, U.S. Pat. No. 4,782,513 involving a voice-prompted bar code reading satellite system, the present invention contemplates in a best mode embodiment, a home device containing the bar code reader wand connected directly to bar code decoding electronics and to a DTMF generator, all simply hooked to the user phone to allow ordering data to be inputted using the bar code wand and the printed bar codes.

This direct conversion of the ordered item alphanumeric information contained in the wand-read bar code into corresponding DTMF tones representing the very same information, and the transmission of this information in DTMF tone form to the remote location is thus not to be confused with mere DTMF dialing, such as in U.S. Pat. No. 4,975,948, or data transmission use in other applications, such as the use of DTMF tone protocol data transmission to a computer as, for example, in U.S. Pat. No. 4,799,254. While, moreover, standard DTMF tones are preferred, other analog tones may also be employed if desired, and such are intended to be generically included in the present specification and claims by the term "DTMF".

The device at the receiving end (merchant's database) decodes the DTMF tones representing the ordered items, with the receiver communicating back with the user of the bar code wand by voice signals (digital, analog, synthesized, or otherwise) of confirmatory, error-eliminating ordered item information, pricing, etc., as later more fully explained. The bar code decoding unit and the receiver unit constitute a pair of devices that allows the user at a remote location to access a distant database; and using printed bar codes, the user may thus input or retrieve information from the database. This is to be contrasted, again, with prior art concepts of mere oral response to touch-tone telephone queries as, for example, in U.S. Pat. No. 4,817,129.

Other prior proposals for remote merchandise ordering include those of U.S. Pat. No. 4,797,913 for an ordering system that permits calling customers to place originating calls and orders with an ordering service office located within a Local Access and Transport Area (LATA) for subsequent routing to the appropriate ordering service vendor; U.S. Pat. No. 4,734,858 for a data terminal and system for placing orders that contemplates the orders being routed by the local processing center to local merchants or to a regional processing center; and U.S. Pat. No. 4,654,482 utilizing a terminal to store ordering information and to order goods or merchandise from any one of several merchants from the home and over the direct distance dial telephone network. Such alternative schemes, however, provide inadequate user-friendliness, high start-up cost and complexity of user learning, and lack simple error-free transmission of order requests among other deficiencies.

The present invention provides a user, thus, with direct contact with the vendor's product database in real time via the telephone network. Since this contact is direct, it is not necessary to be routed by an intermediate service to the vendor. Further, all processing and storing of information is accomplished at the vendor's site rather than at the user's site.

Objects of Invention

An object of the present invention, accordingly, is to provide a new and improved method of and apparatus for remote location ordering of merchandise and/or services (i.e., any items) and the like that overcomes the limitations and disadvantages of prior proposals above explained, and, to the contrary, provides an inexpensive, user-friendly and substantially error-free remote ordering technique, enabling simple home or office user inputting and/or retrieving of merchandise and/or service information and the like from the remote database at the merchant's location.

An additional object of this invention is to provide a new and improved system for remote item ordering by phone, providing communication (without the need for human vendor interaction) with a vendor database via recognizable inputs and responses.

Another object is to provide a novel synergistic combination of user optical sensing and direct DTMF (or in some cases digital) conversion thereof for telephone transmission to a location, remote from the user, and, from the remote location, automatic voice verification and supplementation of the user-transmitted information for remote ordering and servicing functions and the like.

A further object is to provide such a novel remote ordering and interfacing technique that is also useful in other information communication applications, as well.

Other and further objects will be explained hereinafter and are more particularly delineated in the appended claims.

SUMMARY OF INVENTION

In summary, however, and from one of its viewpoints, the invention embraces in a method of user telephone ordering from remote location user terminals at the user telephone, such as at home and office, of items such as merchandise and/or services from a central location, such as a store, the improvement comprising providing for the user machine-readable coded information descriptive of such items; user-initiating the successive machine reading at the user telephone terminals of such coded information corresponding to selected items desired to be ordered from the store by the user; directly, at the user terminal, converting the signals resulting from such machine reading to DTMF signals corresponding to such selected item information and transmitting the same over the telephone to a telephone terminal at the store; receiving and storing the DTMF signals at the store terminal for use in compiling the user's order of items; and automatically responding over the telephone back to the user telephone terminal with successive corresponding voice confirmations of the successive ordered item information descriptions.

Preferred and best mode implementations and available modifications are hereinafter described in detail.

A summary example of an illustrative application of the invention may employ a database at a grocery store. A user at home may use a catalog or any other printed material containing Universal Produce Code (UPC) symbols or other machine readable codes in concert with the before-described preferred remote bar code reading device to access a database at a grocery store. As items are scanned in by the user passing the bar code reader or wand over the bar codes in the catalog that represent the items to be ordered and are transmitted preferably in DTMF form over the telephone to the remote store, they may be added to a list of items at the store that the user is requesting to be delivered. The database at the grocery store may contain personal information about the shopper, including address and billing information that facilitates grocery delivery, and also information about the products available at the store, including price and availability. This ordering example, of course, can be extended from the grocery stores to any retail outlet that provides goods or services or the like. Item codes can be printed in the catalog with the description of the item. The phone number of the merchant can be dialed, and, once connected with the merchant, items can be ordered from the catalog by simply passing the wand over the item's printed code. Videos, pizzas, clothing, and many other goods may thus be ordered using the bar code device. It is possible, furthermore, for other items and remote services, such as bank account transactions, and up-to-date weather and event information, to be accomplished using the bar code device.

The preferred bar code wand device of the invention, moreover, has many advantages over the types described in the before-mentioned prior art. It need contain only relatively few components in order to accomplish its function, reducing size and cost of the device, and enabling many more people to purchase and use the device. Because it connects directly to the phone and uses voice response, the implementation of the invention is less complex, and the software on the receiving end can readily guide the user through its use. The invention is also very general and can easily be incorporated into a phone and used for almost any kind of transaction. Many people are currently put off by high-technology complexity, even in the form of video cassette recorders and fancy audio equipment; but the utter simplicity of the device herein will allow many people to understand its use easily and to be very comfortable therewith.

Another major advantage of the way bar code information is used in the present invention resides in its direct connection to the remote database during use. A fundamental principle of database design is to eliminate redundant information which allows for errors, particularly because many locations have to be updated every time information changes. If any locations are either incorrectly updated or not updated at all, the database is inaccurate. Information updates, in addition, take time, and the time spent trying to keep redundant information accurate is unnecessarily wasted. A better way to maintain information is to keep it in one central location, and keep that central location updated as needed. Anyone requiring access to that information can then connect to the central location and find out the data required. The bar code reader use of the present invention, accordingly, relies on centrally located information for its use and avoids the danger of spreading dated information around to numerous homes or remote locations. For instance, in large grocery stores, price changes can occur daily. The price changes often encompass over 1,000 items each week. Trying to keep the data stored in remote locations accurate would be an overbearing task.

The voice response of the invention which repeats the very bar code ordered information transmitted in its directly converted DTMF tone form back to the user unit in voice form confirmation over the telephone, is also a great advantage. Adding a visual display or printer to the remote ordering device would increase the cost of the unit, though the system may also provide LCD information. Most people, however, can understand voice response, and TDD (Telecommunication Devices for the Deaf) devices for hearing impaired may be provided for those with limited hearing. Since the phone system already provides a means to transmit voice, an expensive modem is unnecessary in accordance with the invention.

While DTMF tone use is presently preferred, the growing ISDN (Integrated Digital Services Network) technology may not in some instances require that tones be sent over the phone. The phone service may be all digital, so that digital and converted analog data may be sent at the same time. For instance, instead of being required to send audible information over the phone and have it decoded (like the Touch-Tones), the bar code wand reader could use the digital portion of the line that is multiplexed with the voice signal to indicate the proper information to the computer. An audio signal output at the same time would indicate to the user that the tones were being sent out and that the bar code was read correctly. Thus digital ordering information, not necessarily DTMF tones, may be sent over the line at the same time as audio information is being sent. Printers, displays, indicators, and other types of input may also be added quite easily, because information can then be sent quickly and transparently from the store to the home and back. The user, for example, may scan a bar code with the wand and have the voice respond with the name and price of the item, and at the same time see the price displayed on the LCD terminal. The user may also request a printout that either prints out the items as ordered or just prints all of them out at the end of the ordering session. Although this type of a setup would be more expensive for the home user, some users may desire that type of feedback.

DRAWINGS

The invention will now be described with reference to the accompanying drawings, FIG. 1 of which is a block diagram of the user (home, office, etc.) code-reading-ordering system constructed in accordance with a preferred bar code reader technique of the present invention;

FIG. 4 is a flow chart of the cooperative operation and interfacing of the merchant's remote central information unit CIU;

Figure 6:
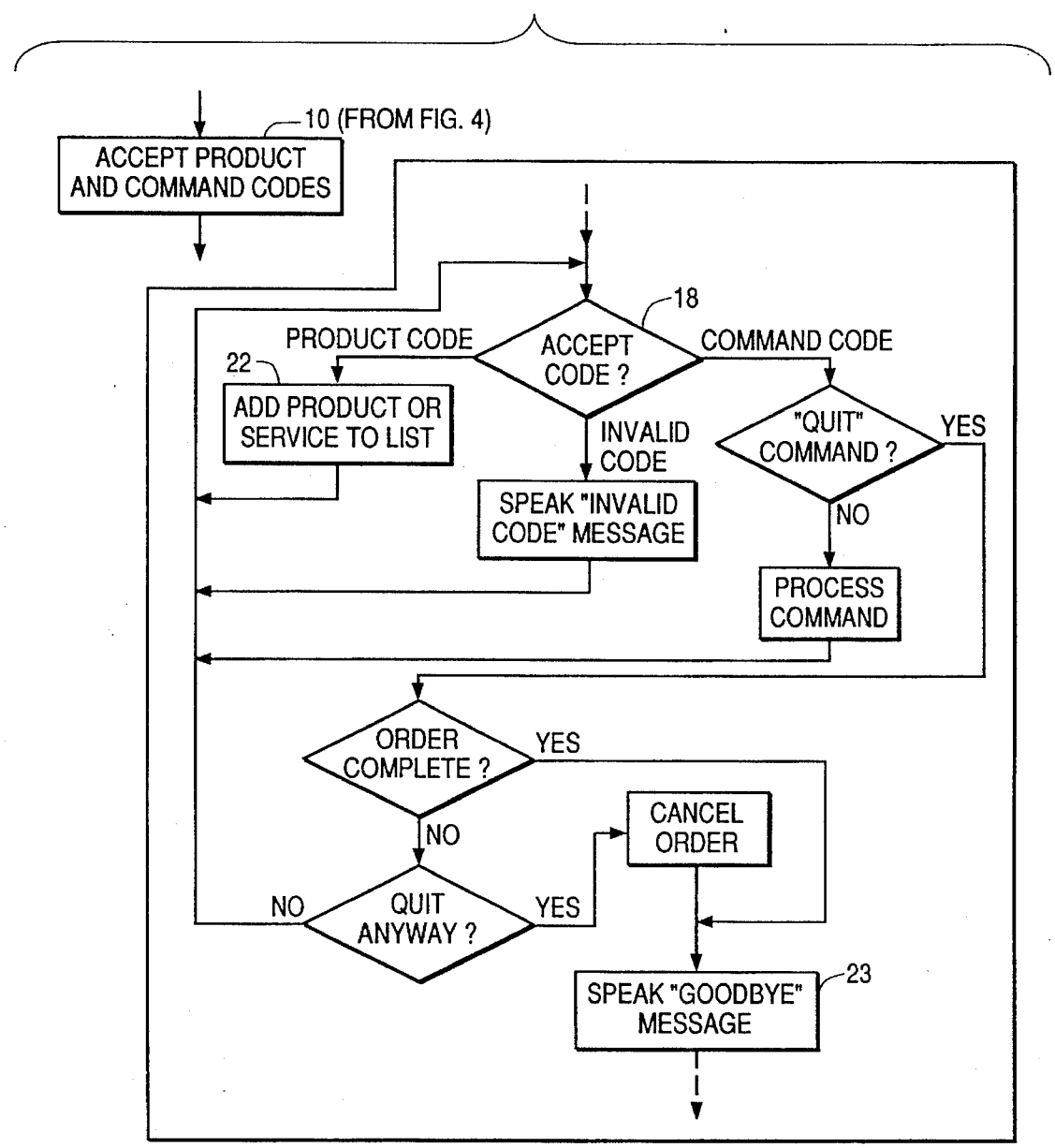
FIG. 6 is a similar program flow chart of the "Accept Product and Command Codes" portion of FIG. 5.
Figure 8:
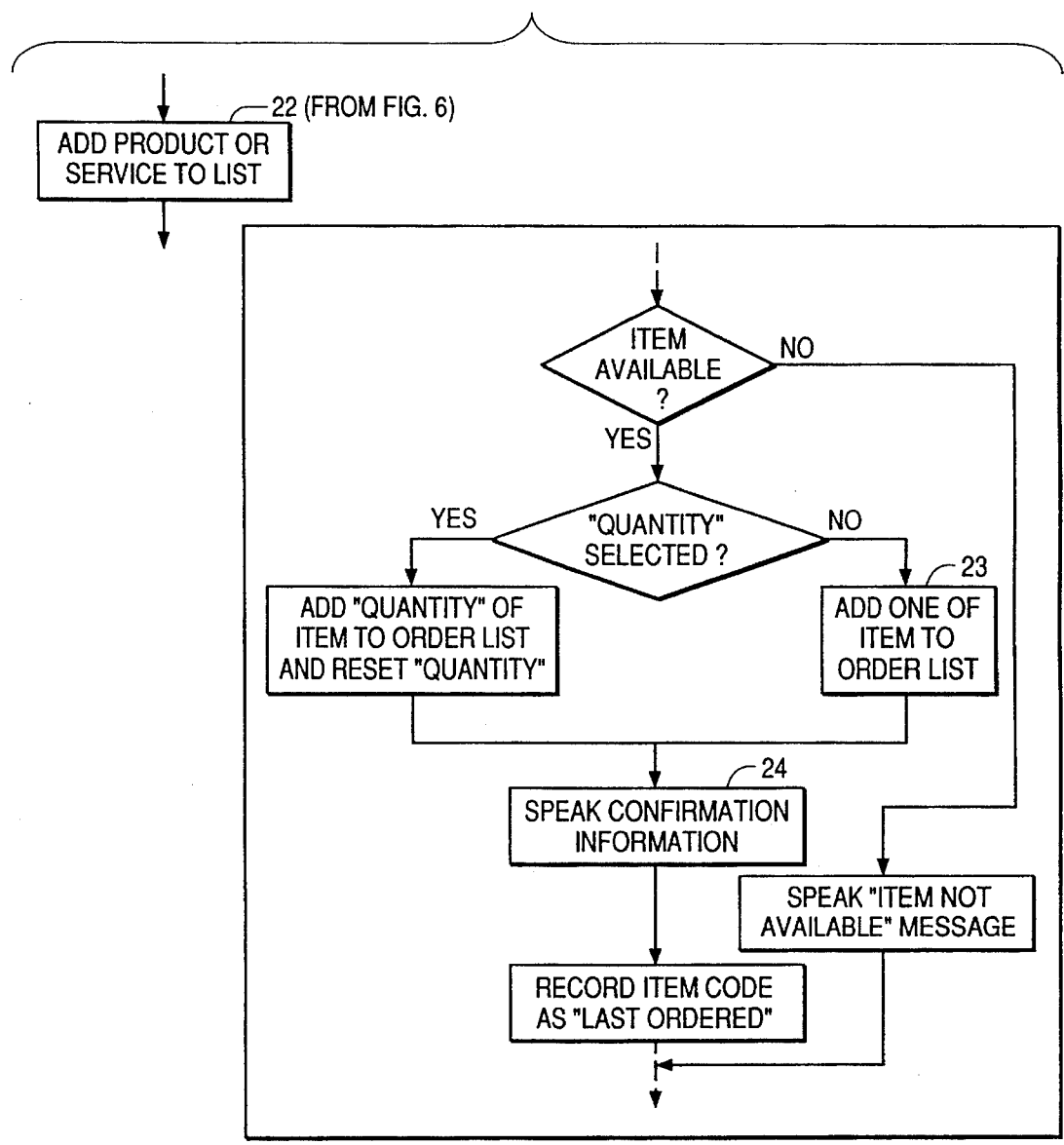
Figure 9:
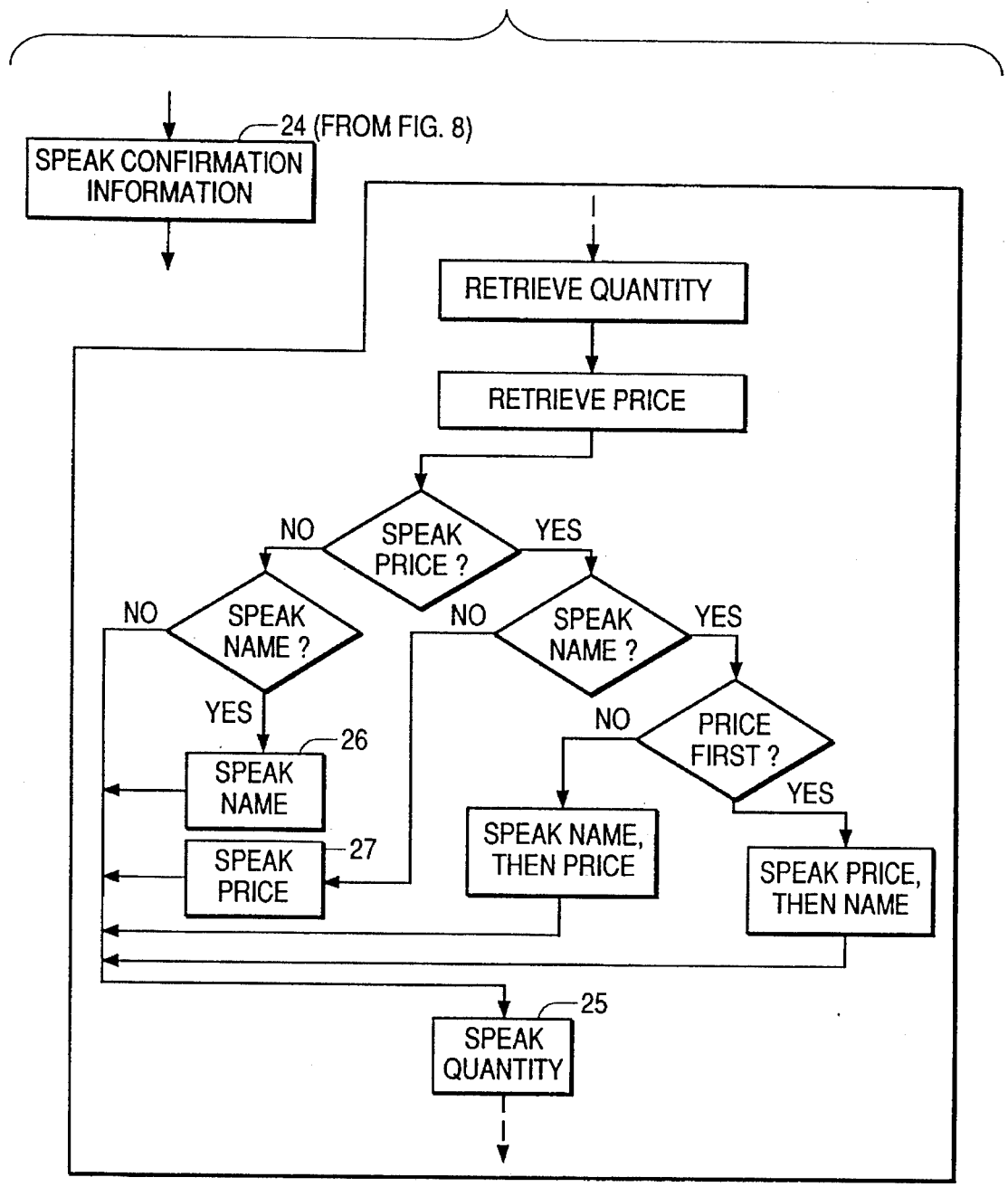

FIG. 8 similarly presents the detailed program of the "Add Product or Service to List" section of FIG. 6; and FIG. 9 presents the detailed program of the voice or "Speak Confirmation Information" function of FIG. 8.

DESCRIPTION OF PREFERRED
EMBODIMENTS OF INVENTION

Figure 1:
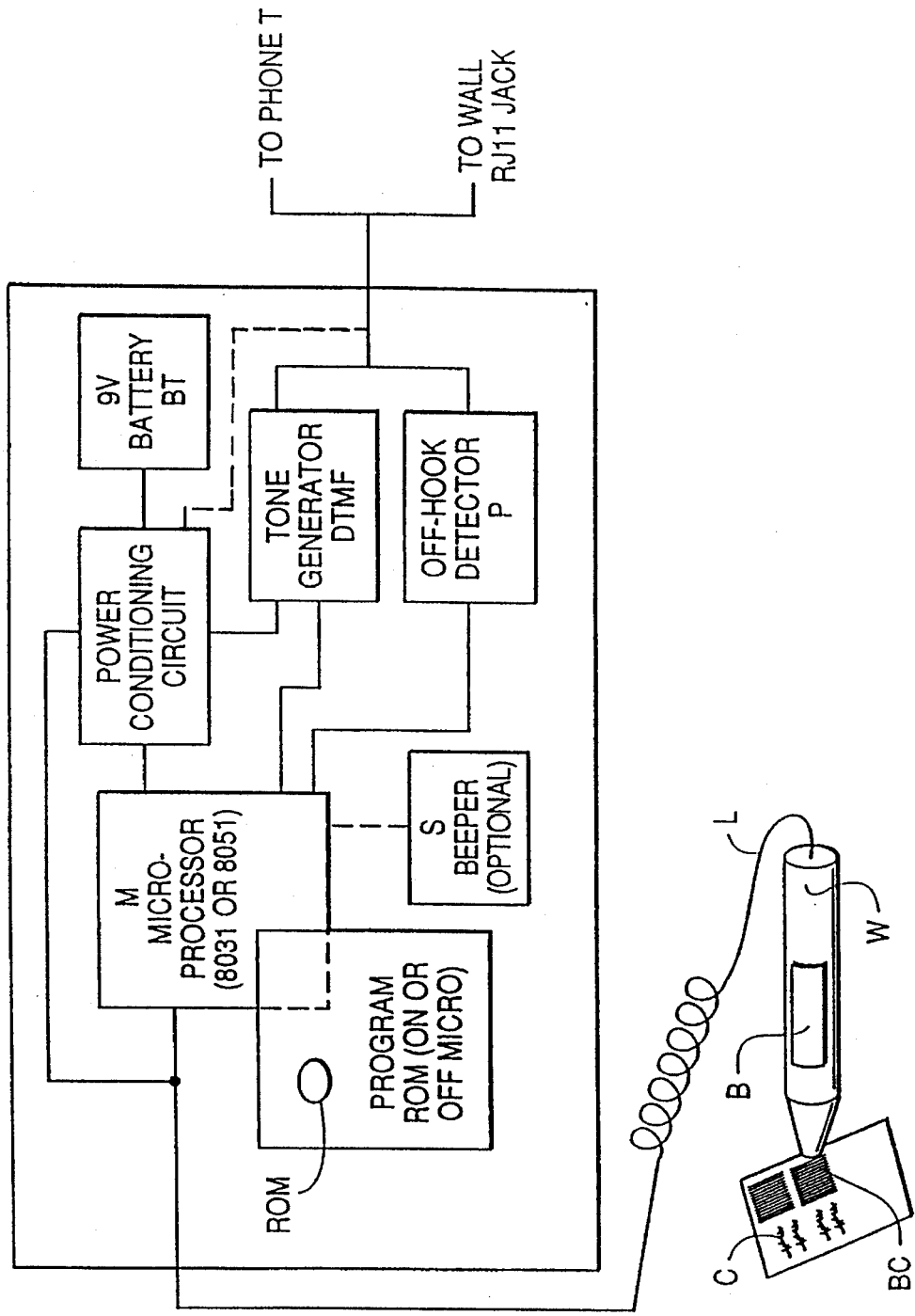

Referring to FIG. 1, the user ordering unit provided at the telephone instrument T (or ultimately as an integral part built into the telephone instrument), powered by batteries BT, or from the mains, or the phone unit itself, if desired, is shown comprising the preferred bar code reader wand W for scanning selected items-to-be-ordered as listed in a catalog C or the like containing identified machine (wand)-readable bar codes BC describing those items. The dashed line in FIG. 1 illustrates an alternative power supply approach for powering the unit from the phone line instead of using battery power.

As before discussed, underlying the invention is the direct conversion of the machine-readable bar code item description information to corresponding DTMF tone signals, representing that very same information, for digital transmission over the telephone T to the remote store or other location. This conversion is effected with the aid of a microprocessor M cooperating with a local program storage ROM, which ROM may or may not be part of the microprocessor, a tone generator DTMF, and with a conventional telephone connection circuit P comprising well-known line switch, signal coupling and off-hook detector circuits, etc.

Turning, first, to the role played by the microprocessor M, it receives input at L, FIG. 1, from the bar code wand reader W, decodes it, and, through the phone connection circuits P, sends the decoded information in special form to the remote database (merchant) over the phone lines T. The bar code wand output consists of a series of pulses of various widths. The pulse voltage levels are compatible with the microprocessor in that the microprocessor recognizes the transitions of the bar code wand as the wand output varies between 1 and 0 digital logic levels. The microprocessor converts the pulse train into the ASCII (alphanumeric) representation of the bar code in well-known fashion. The numbers that are temporarily stored in the microprocessor after the conversion are the same as the numbers that the bar code represents, as later explained. These numbers contain merchant and item information, but because the microprocessor does not have immediate access to a database containing that information, it does not translate it further into specific item information such as price and item name.

When the microprocessor M has successfully converted the bar code wand output into the corresponding alphanumeric representation, it can, if desired, trigger a small speaker or beeper or other transducer S in the device to indicate success, though such is not essential. If such a beeper is used, for instance, it could beep at a specified frequency for a given amount of time when there is a successful conversion. If the conversion fails because of the inadequacy of the printed symbol, or if an uneven motion by the user hand employing the wand W to scan the bar code BC does not allow a conversion, the microprocessor could indicate failure by not beeping. Other ways could also be used to indicate failure, including a different beep than the one used for a successful decoding.

The microprocessor M then takes the string of digital data temporarily stored in on-board random-access memory (RAM), and drives another transducer directly connected to the telephone line in the form of a DTMF tone generating chip connected to an impedance matching transformer. The tones sent over the line will usually consist of the tones corresponding to the numbers or digits that were encoded in the bar code symbol BC—the very same ordered item information or description. It is possible to encode and send sequences of tones that also stand for alphabetic information in addition to strictly numeric information, as later discussed in detail.

To operate the ordering system of FIG. 1, the system must be connected to the same line as the phone T, as shown. The phone will always operate properly when connected to the device because the connection is the same as if the phone were attached directly to the wall. An on/off switch is not necessarily required for the device, because a button B on the wand W and the microprocessor M may together control the power switching of the device. For instance, when the button B is pressed, the wand electronics and the microprocessor electronics may be connected to the power source BT. The microprocessor M is initialized automatically, and begins to run a program stored in the read-only memory ROM. The program consists of a sequence of instructions to the microprocessor M that monitor the output of the bar code wand W, as detailed in FIG. 3A. When a valid bar code BC is read and the tones are transmitted over the phone line, the microprocessor M shuts itself off, unless the operator continues to press the button on the wand B. Any time that the operator releases the button B, if the microprocessor M has not by that time decoded a valid bar code, the system is powered down.

In the preferred embodiment, the power is drawn from a 9-volt battery BT, but the phone line could, as before stated, supply the necessary power for the electronics with a small change in circuit. An adapter could also convert the power from a wall outlet into power usable by the device directly and obviate the need for the battery BT. The wand button B, however, is not an essential part of the device because the electronics could be turned on by the phone being taken off hook, using the before-mentioned off hook detector P. The power management function of the wand button B is, however, a useful technique for increasing the life of the battery BT.

As the user passes the wand W over a valid bar code BC, the microprocessor M decodes the bar code. When the bar code has been decoded successfully, the bar coded information is converted to DTMF tones, as before outlined. The initial bar code that can be scanned during the ordering process could contain the encoded phone number of the remote merchant from whom the user of the device wishes to place an order, with the microprocessor dialing the correct merchant phone number as is well known, or the merchant may be directly dialed or dialed from stored memory at the phone.

It is conceivable that the user of the bar code reader device would not like to hear the tones that are sent over the phone by the device. In such event, it is possible to disconnect the phone from the line without hanging up the phone during tone generation. This would mean that the central location would hear the tone, but the operator of the bar code reader would not. While, as before explained, a beep from the optional beeper S could indicate success in reading the bar code, in the preferred embodiment, the tones heard by the operator on the phone are an indication of the success of the device in reading the bar code, and the phone would not be taken off-line during tone generation.

Figure 3A:
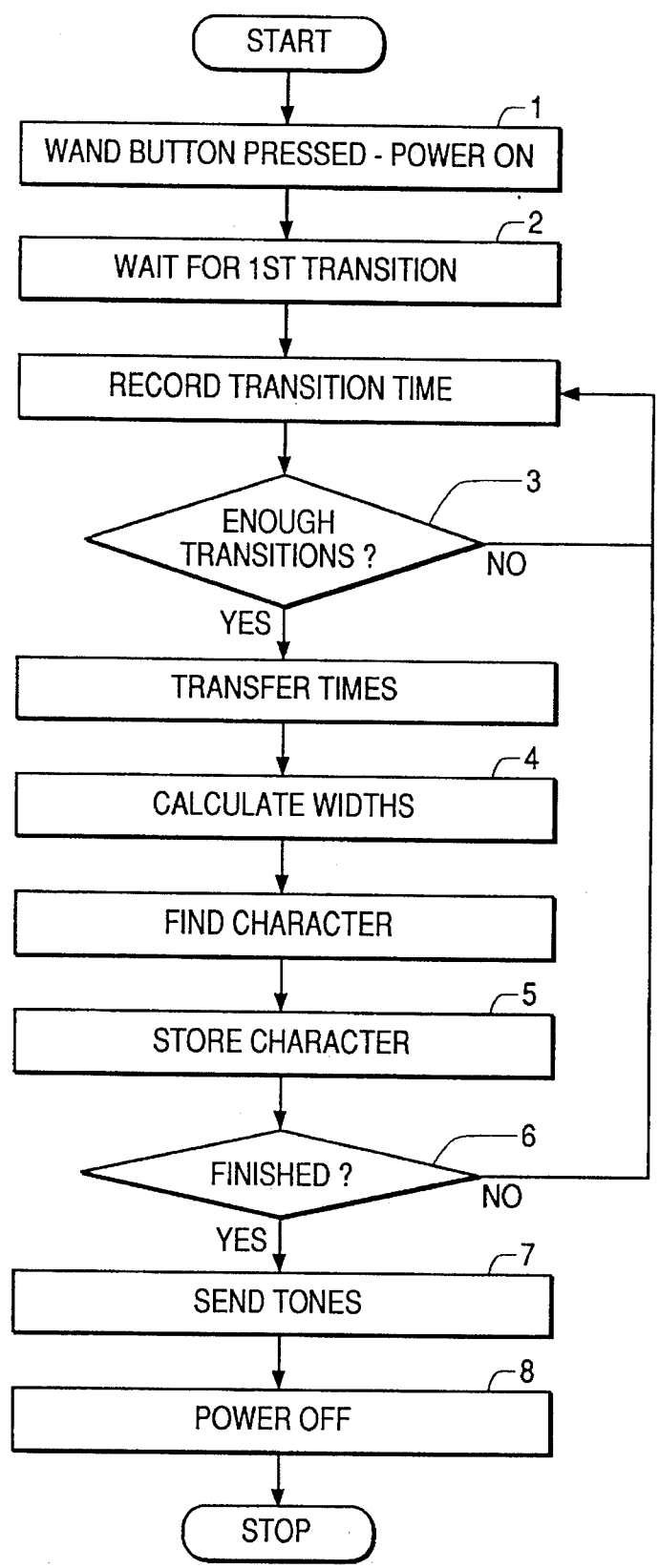
FIG. 3A is a flow chart of the operation of the user system of FIG. 1, and FIG. 3B a diagram of typical storage and calculation transition times in the microprocessor reception of the bar code-read signals.
Figure 3B:
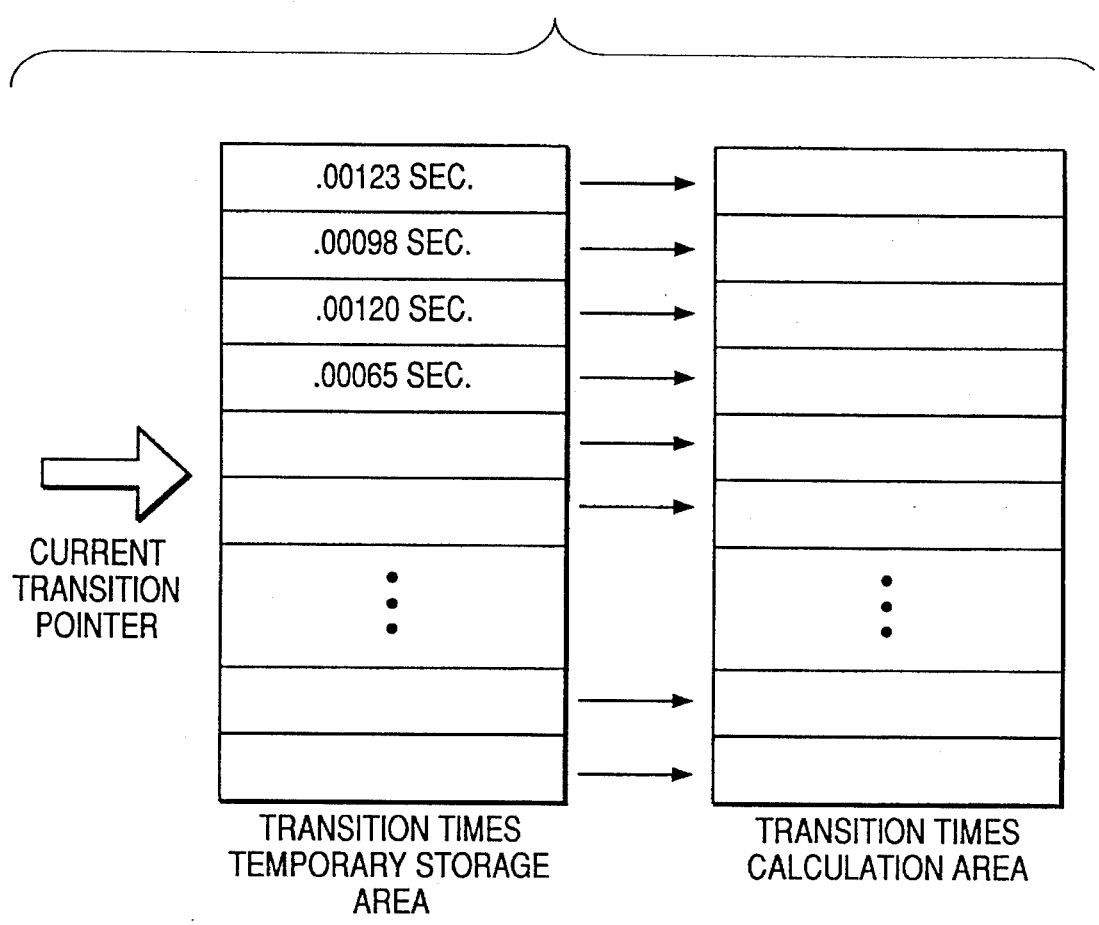

The bar code reader program and microprocessor operational details are shown in the program of FIG. 3A, wherein, when the button B on the wand W is pressed, the microprocessor M is powered and reset as at 1, and awaits the first white-to-black scanned or read bar or code transaction at 2. The first transition starts a timer, while every subsequent transition causes the time since the last transition to be stored, FIG. 3B, and the transition pointer to be incremented. When the appropriate number of transitions has been received, as at 3, the transition times are transferred to a different storage area and the relative widths of the code bars and spaces are calculated (4). The widths are compared to a table of valid width combinations, and when a match is found, the character is stored in the storage area 5; and when the terminating code is reached, the microprocessor shuts off the transition timer (6). The DTMF-generated tones corresponding to the stored characters are then sent over the phone line at 7 by the tone generator. When the last tone has been sent, the microprocessor M turns the circuit off at 8. The microprocessor M resets if the time between two transitions (FIG. 3B) is too long for a valid code.

While instructions on the use of the device may be supplied with the device and can be spelled out in detail in the ordering catalog, the invention enables the Central Information Unit (CIU) at the store to provide a mode of operation that allows those using the device to simply follow instructions given over the phone lines once connected to the CIU.

Figure 2A:
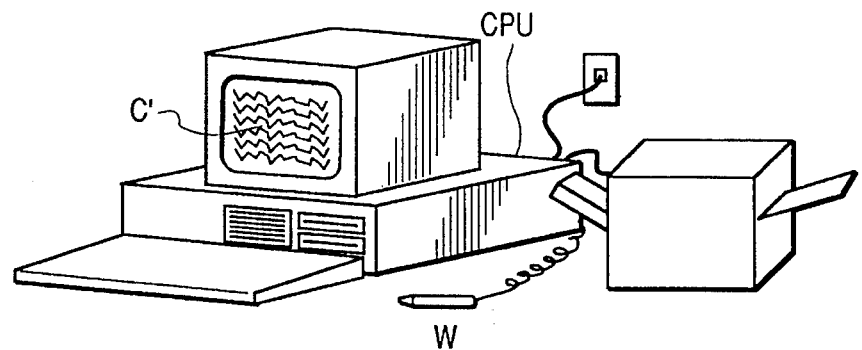
FIG. 2A is an isometric view of a central location unit hardware system (at merchant's location, warehouse, etc.) cooperating with the telephone network over which users are to communicate to order merchandise and/or services and the like, with FIG. 2B presenting a block diagram similar to FIG. 1 of the contents of the CPU.
Figure 2B:
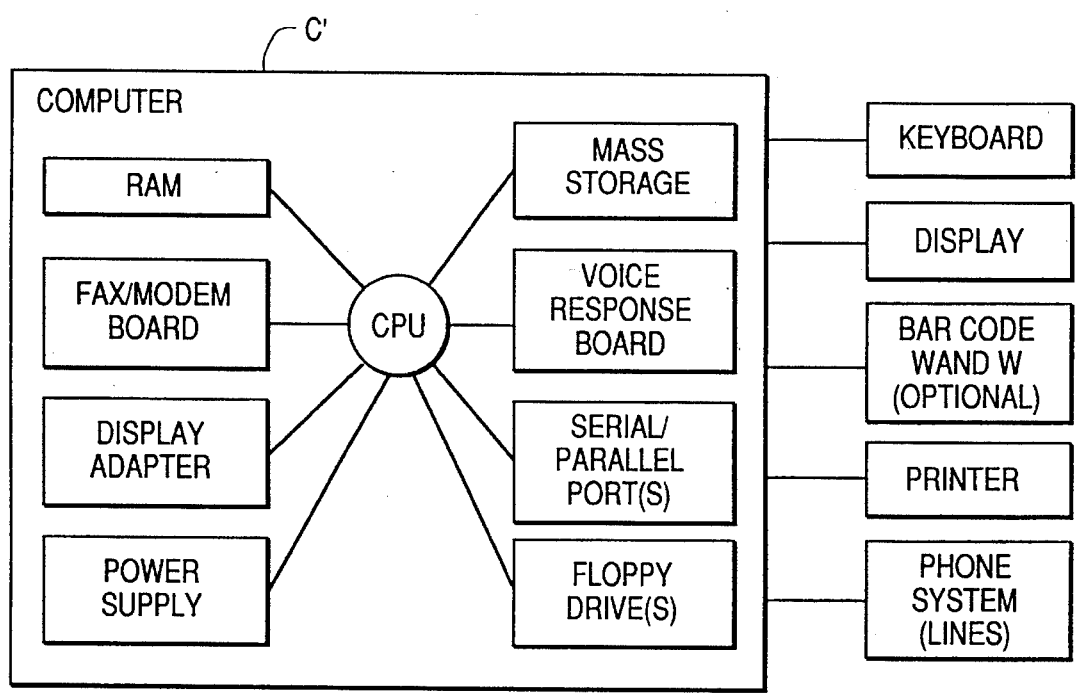

At the store or other database central location, there is provided a computer C' and various peripherals, FIG. 2A, the components of which are shown in the block diagram of FIG. 2B. The computer C' contains a central processing unit (CPU), random access memory (RAM), a single or multiple voice response board so-labelled, a FAX/modem board, and non-volatile mass storage (e.g., hard disk) containing CIU software, customer database, product or item/service database and voice files. A CD-ROM drive with additional voice files and a tape backup unit may also be provided, if required. Connected to the computer C', as labelled in FIG. 2B, are a keyboard, display device, printer, optional bar code wand W and the telephone lines.

The method of communication from the store CIU to the remote user device (bar code interpreter) will, as before discussed, preferably be voice. The voice signal sent from the CIU to the remote user device may be generated synthetically by converting text using a text-to-speech conversion algorithm and special well-known hardware which is readily available. Another option for high-quality speech generation is digitized voice that is stored on the CIU. Several interface boards that perform speech digitization and playback are commercially available for IBM PCs and compatibles. The preferred embodiment employs a sound digitizing board for generating the voice signal for transmission to the user phone.

A typical database access session would begin with a user lifting the handset of the remote telephone T, FIG. 1, and removing the bar code wand W from its holder with the other hand. The user may begin the communication process by passing the bar code wand over the encoded telephone number of the CIU, such as presented in one of the bar codes BC. When the CIU connects to the phone line by taking the line off-hook, it begins a communication session by speaking a welcome message, FIGS. 4 and 5, over the line as in other present-day response systems. When the user hears the welcome message, the CIU at the store is ready to accept information, including commands and data.

For illustrative purposes, as before discussed, consider a merchandise ordering system as an example of a possible transaction with the CIU. Many other examples are possible, including remote banking, credit checking, inventory control, etc. While commands and data that can be sent to and recorded by the CIU are virtually unlimited, in connection with this illustrative example, there will be concern only with those commands and data related to ordering merchandise.

Upon connection to the store CIU, it is then necessary for the user of the bar code wand W to identify himself or herself. This is easily done by allowing the user to scan in an identification bar code (ID) supplied by the merchant when the account is set up with the merchant. The user can enter the ID code either by scanning a bar code representation of the ID, or typing it in using the touch-tone keypad, if desired, as is well known.

As is customary practice in other related applications, the CIU can determine whether there are any available lines for the user to place an order, and, if a line is not available, either the CIU can put the user on hold, or can estimate the amount of time that will be required to wait, and call back the user when a line is available.

Once connected to an ordering line on the CIU, the user, using the wand W, can place an order, set up a delivery time, query a pending order, or ask for information about items available for order. Other types of commands can be accepted by the CIU, but for this example, these will suffice. The CIU decodes the commands and reads back requested information. For instance, if the user of the device would like to order something, the user scans the code corresponding to that item from the merchant-supplied catalog C, or, if desired, from the label of the item, or from some other source.

The broad central location (store) unit software flow chart is presented in FIG. 4 wherein the functions of customer identification (9) and acceptance of product or item commands transmitted as DTMF tones from the user (10) are involved.

Figure 5:
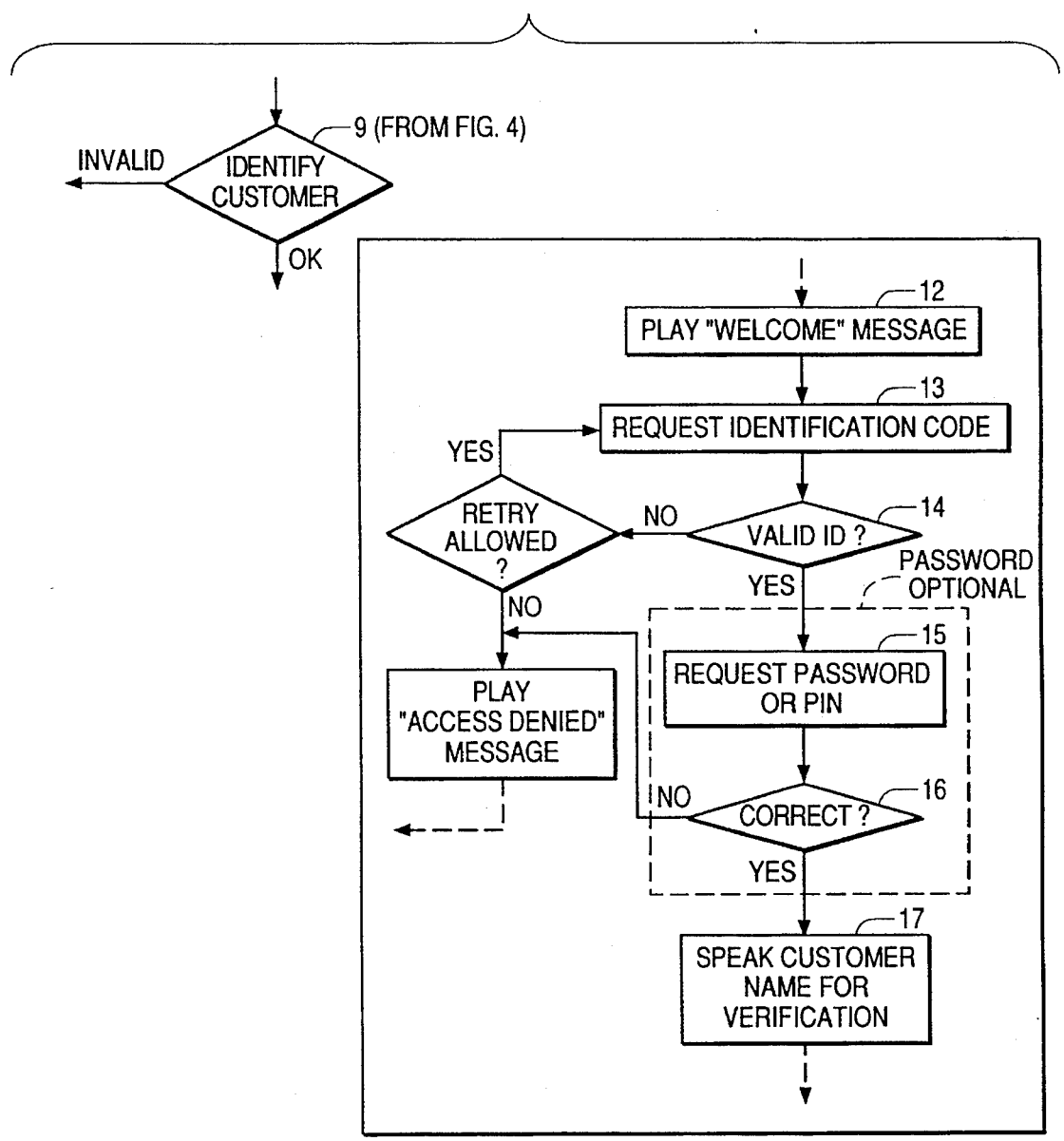
FIG. 5 is a more detailed flow chart of the customer ID "Identify Customer" block of FIG. 4.

An example of a transaction is shown in the flow charts of FIGS. 4, 5 and 6 and involves the following:

User passes wand W over merchant phone number bar code or dials it in using phone touch pad at T, FIG. 1.

Device dials the phone using DTMF tones.

Merchant or store device (CIU) answers phone (11, FIG. 4) and speaks welcome message over the phone at 12, FIG. 5.

CIU requests at 13, FIG. 5, that user pass bar code wand over identification bar code.

User passes wand over identification code.

CIU received ID code and matches code with customer in customer list at 14.

CIU checks credit, if desired, and other pertinent information.

If a password or Personal Identification Number (PIN) is required to access the CIU as at 15, the customer is asked to pass the wand over the password bar code and the received password is compared to the password list on the CIU at 16. The password may also be input, using DTMF tones generated at the keypad on the phone, or spoken and recognized by speech recognition hardware (later discussed).

A valid ID code may consist of a numeric or alphanumeric code that has been preassigned to a particular customer, or any information required for the CIU to the customer database, including customer name, shipping address and billing information. The merchant unit, moreover, may allow the customer to input the ID or password information more than once, if needed, to allow for mistakes.

CIU acknowledges customer by speaking customer's name over the phone at 17, FIG. 5.

If there are no order lines available on the CIU, it will speak an approximate call-back time to the customer and dial the customer's number when it is available for placing an order. Otherwise, it will allow the customer to place an order immediately.

CIU indicates by voice that it is ready to accept items for order commands as at 18, FIG. 6.

Figure 7:
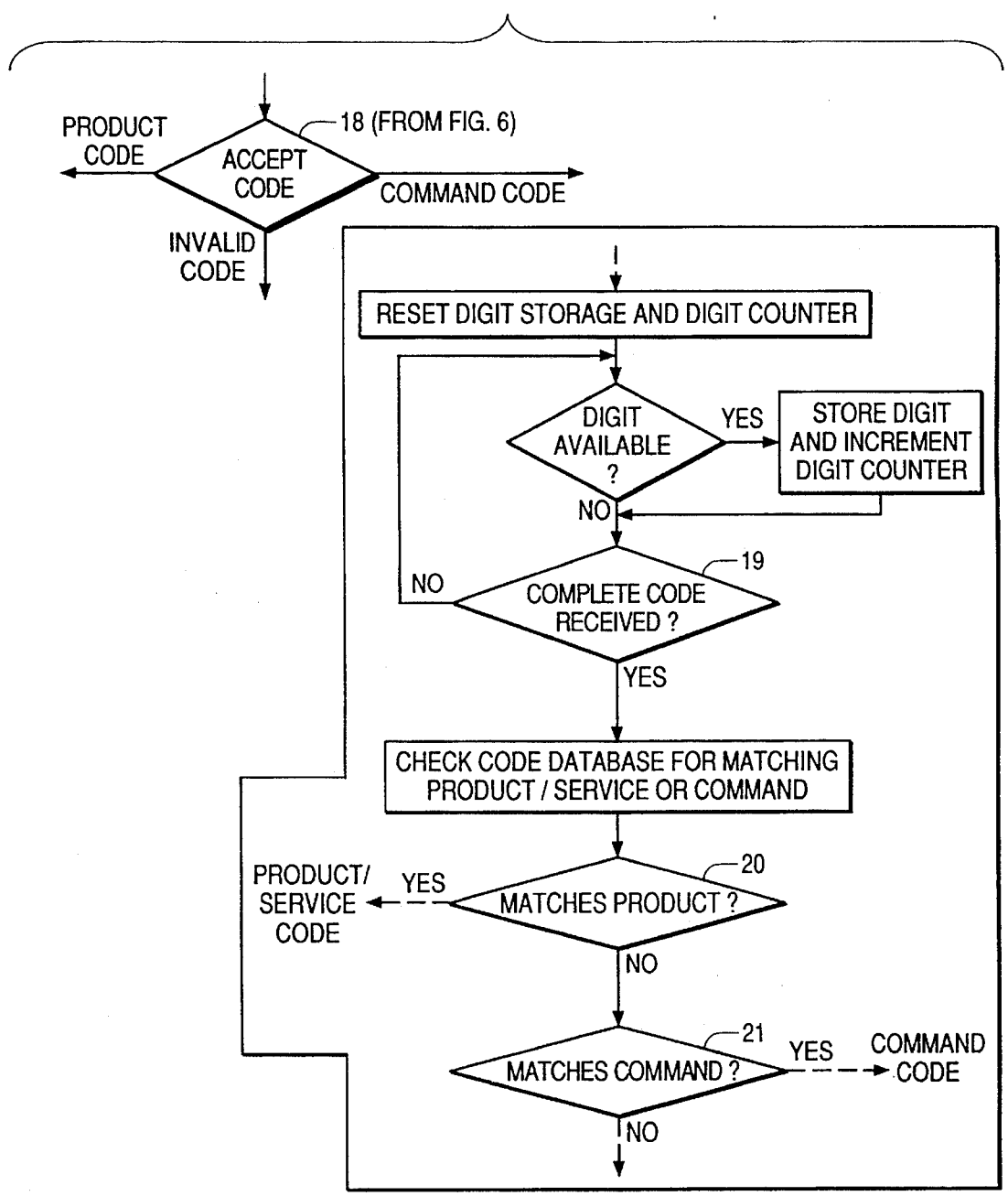
FIG. 7 is a similar program chart of the details of the "Accept Code" steps of FIG. 6.

The "Accept Code" function 18 of FIG. 6 is detailed in the flow chart of FIG. 7, outlining steps for checking digits to determine if a complete code has been received (19) and checking with the database to match with products (20). The receipt of a complete code can, indeed, be determined in several ways. If the product or command codes are defined to be a specific number of characters, for example, receiving the correct number of characters would indicate completion of the code. Alternatively, a delay of more than a specified amount of time between tones may indicate that no more tones will be received for that code.

Returning to the sequence of steps, the customer then passes the wand W over a command or product bar code BC or other machine readable code, FIG. 1.

User remote unit recognizes bar code and converts bar code information to DTMF tones that are sent over the phone T to CIU.

User unit may, if desired, and as before described, switch phone connection off briefly during tone generation to prevent the customer from hearing the DTMF tones, thereby reducing the annoyance factor; or the user unit may also just reduce the tone sound level being sent to the remote phone so that the customer using the remote device still has some feedback about what is being sent to the CIU.

CIU receives and recognizes DTMF tones and accepts and converts them to valid item codes or command codes, as before outlined.

If a command is received, CIU acknowledges recognition of the command and proceeds to follow the direction of the customer providing automatic voice feedback where necessary. Valid commands may include cancelling or placing an order, changing delivery time or date, deleting previously ordered items, etc.

If an item is recognized, as at 21, FIG. 7, the CIU will add that item at 22, FIG. 6, to a list of items maintained for that customer to be delivered with the next delivery.

Customer will continue to scan successive bar codes with the wand until the order list is compiled.

When requested by the customer, the CIU will place or cancel the order, speak a closing message at 23, FIG. 6, and disconnect itself from the phone line by hanging up the phone at 24, FIG. 4.

The user, at any time during the ordering session, may scan a code that indicates his/her desire to have the order list and prices sent to a facsimile (FAX) machine after the order has been placed. Following the scan of the code, the computer may request the phone number of the FAX machine to which the list should be sent. The number could also be stored in the customer database in the computer so that the customer would not have to repeat it every time a FAX-back is desired. Once the order is completed, the computer constructs the document to be faxed and indicates to the software responsible for sending the FAX the location of the constructed document. Such send-FAX boards are currently readily available for PCs and the software and technology for faxing electronic documents has been available for some time.

An alternative to requesting the ID of the person using the service, as above described, is to retrieve the Caller ID information from the telephone line when the call is received. This ID generally consists of information indicating the location of the caller (usually the phone number of the calling party). Using this information and a computerized database, a computer is able to determine the name of the person who is placing the call, if that person is located in the database. Although in some instances this would alleviate the need for requesting the ID of the caller, most likely a password or "Personal Identification Number" (PIN) would be needed as at 15, FIG. 5, to verify that the ID was correct.

Since it is entirely possible that more than one caller could be using the same phone to place orders, it is necessary to allow the caller to still indicate his/her ID using the wand. If the computer receives a call from a phone that is used by more than one customer (indicated in the computer database compiled from previous calls) it could still request the ID of the user for verification. The computer would be able to maintain the caller ID database.

The following is a list of possible commands that a customer may send to the merchant CIU:

| Command | Summary |
| --- | --- |
| Delete Item | The CIU asks customer to scan in UPC correponding to item to be deleted. The CIU then replies with the name of the item and how many of the item remain. |
| Delete Items | The CIU asks customer to press digits corresponding to quantity (or scan codes corresponding to quantity) to be deleted, and then scan UPC of item to be deleted. CIU then replies with the name of the item, how many have been deleted, and how many remain. |
| Delete Previous Item | The CIU deletes one of the items just entered and replies with the name of the item and how many are remaining. |

In some situations, it may be inconvenient to reach for the keypad or look for a specific "yes" or "no" bar code to indicate an answer to the store unit during the ordering process. Speaker independent voice recognition may be used to allow the store unit to accept indications of "yes" or "no" by recognizing those words when spoken by the user. Such limited speaker independent voice recognition is now available in low cost using either hardware, software, or a combination of both. The hardware involves voice recording and playback and has software for recognizing simple words spoken by almost anyone connected to the hardware, such as "yes", "no", the digits "0" through "9", and some other simple words.

Voice commands, moreover, may be used at any time during the ordering process. For instance, any time that confirmation is required for a particular command, voice recognition could be used as an alternative to pressing a key on the keypad or scanning a bar code. Some commands could be activated using voice instead of a bar code. An example of where voice recognition would be most useful is in deleting items that have been ordered. When a code is scanned and an item is added to the order list, the name and price are spoken over the phone. If the price is too high, or the user changes her/his mind, she/he can delete the item by speaking either "NO" or "DELETE" into the handset of the phone. The voice recognition hardware recognizes the spoken word, and deletes the last item added to the list, alleviating the need for the user to scan the "Delete" bar code or press a key on the phone. Delivery time and date may also be set up by speaking; for example, "Delivery, Monday, Time 5:00 p.m." into the handset. The voice recognition equipment determines the spoken words and sets up the delivery to the correct time and date, and may also confirm the time and date by speaking it back to the user.

| Command | Summary |
| --- | --- |
| Add Item | This is the default operating mode of the CIU. This command is activated automatically when a valid item code is received by the CIU. When a valid code is received, the item is added to the current list at 22, FIG. 6. A quantity of an item may be added to the order list by pressing a digit |

| Command | Summary |
|---|---|
| | or series of digits followed by pressing the octothorpe (#) (or scanning a bar code corresponding to a quantity) followed by scanning the bar code of the item in FIG. 1. When an item is added to the order list as at 23, FIG. 8, the CIU responds by speaking the name of that item over the phone to the customer at 24. It may also speak the quantity of that item if more than one has been ordered. This will indicate to the customer that an item has been ordered in a quantity other than one, as at 25 in FIG. 9, or has been ordered previously during the compilation of the order list. In addition to the item name (26, FIG. 9) and quantity (25), the current price of the item may be spoken over the phone at 27, to allow the customer to know the current price. The order in which the name and price are spoken, if they are spoken at all, can be specified by the individual using the system. |
| Inquire about Item | The CIU may contain more detailed information about an item than is given when the ordered item is verified or confirmed back to the user by voice and is added to the order list. If the customer is interested in nutritional information, or whether that item is in stock, etc., the customer may pass the wand over the "Inquire about item" command and then pass the wand over the bar code of the item of interest. The CIU will then provide to the customer more or supplemental voice information about the item, including, for example, availability, nutritional information, etc. |
| Inquire about Weekly Specials | Supermarkets often have weekly or daily specials. It is important to accommodate as much as possible the customer's ability to take advantage of low price items and specials. Scanning this command bar code may present a voice menu that allows the customer to hear about and order items that are available as part of a special deal. Upon scanning this command, the customer may be asked to press a key corresponding to one category in a list of categories spoken over the phone. For instance, the CIU may respond: "For specials in the grocery department, press 1. For specials in the deli, press 2. For specials in the meat department, press 3, etc." Once the customer has specified a department of interest, the CIU may speak another menu over the phone like the following: "Today, extra lean ground beef is on sale for $1.99 per pound. To order ground beef press 1. Boned chicken breasts are on sale for $4.50 per pound. To order chicken breasts, press 2", etc. The customer may follow the instructions given over the phone either to order or ignore the daily and weekly specials. Another way of accessing specials is to include in the catalog C, bar codes corresponding to specials in each department. Instead of scanning a code generically entitled "Specials", the operator of the device could scan a code entitled "Deli Specials", or "Meat Department Specials". The CIU could repeat over the phone a list of specials in that department, with each special associated with a number as it is spoken over the phone. Several bar codes could be printed beneath each department special bar code to allow the customer to order the special of interest. For instance, several bar codes could be printed that say "Meat Department Special #1", "Meat Department Special #2", etc. Scanning one of those bar codes would add the item listed in the special for that week to the order. Having the bar codes placed in this way in the catalog would alleviate the need for the user repeatedly to press the keys of the phone and maneuver a |
| | complicated specials menu. The customer could indicate directly what is wanted, instead of listening to a time-consuming series of descriptions and menus. |
| Least Expensive in a Category | Often, a customer may be more interested in a particular item, like flour or sugar, and not have a brand preference. Scanning this command, followed by a category command, like flour, white bread, or butter, would add the least expensive item in that category to the list. The name and brand of the item would be spoken back to the customer along with the price, allowing the customer to cancel the item if it is not wanted. It is also possible to encode the category in the "Least Expensive" command bar code, so that the command could be 'Least expensive pickles', or 'Least expensive toilet paper'. This would mean that the customer would only have to scan one bar code to order a 'least expensive' item in a particular category. |
| Set-up Delivery Options | Where applicable, it is important to allow the customer to set up delivery options (including time and date) during connection to the CIU. For instance, it is possible that the customer would prefer to pick up the groceries instead of having them delivered. This command allows the customer to send information to the CIU about the time and date of the requested delivery and whether it should be delivered or picked up by the customer. When this command bar code is scanned, the CIU may begin a dialogue with the customer allowing changes in time or date. Times and dates could be encoded in bar code from in the merchants catalog or on a separate card or paper. The customer would choose delivery times and dates by passing the wand over the appropriate bar codes. In a situation other than a grocery store, items that are non-perishable may be sent by U.S. Mail, Federal Express, or some other service. This command would allow the customer to express a preference on how the item would be sent. The CIU could offer delivery options along with estimates about how long it will take for items to arrive using each delivery option. The customer may then choose which method of delivery is desired. |
| Inquire about Delivery | This command would allow the customer to hear the time and date and location of the delivery, along with other options that have been selected, spoken over the phone. If the scheduled delivery is not in line with the customer's desires, changes could be requested with the Setup Delivery Options, command. |
| Change Password | For customers or merchants requiring passwords for access to the CIU, this command would allow customer to select and change a password. This command may not be available from every merchant because some merchants may not use passwords and some may require a different method of changing passwords. |
| Check Credit Limit | A customer may want to know what credit limit is associated with the account with the merchant. Merchants using their own credit or debit cards may have this information available to the customer through the CIU. The CIU may speak the available credit over the phone at the request of the customer. |
| Inquire about Total | This command would allow the customer to hear the total cost of the items in the current order. This would allow the customer to track how much money will be spent with that order. |
| Speak Current Order List | A customer who wants to know what is on the current list may request that the list be spoken over the phone. Although this could be time consuming, it may be important for the customer to be able to track what is being ordered. The CIU could being listing the ordered items over the phone in response to this command being received, |

| Command | Summary |
|---|---|
| | with the CIU stopping the reciting of the items when any subsequent command is scanned. The CIU may allow different options to this command, including speak list with or without prices, etc. |
| Confirm Current Order List | This would be similar to the 'Speak current order list' command, except that the CIU would pause after each item for confirmation from the customer. If the customer decided that an item was not wanted for this order, that item could be cancelled. The same options from the 'Speak current order list' would apply to this command. |
| Add Items to Automatic Weekly List | A weekly (automatic) order list may be kept on the CIU. These items would be delivered weekly, whether or not any contact was made with the CIU by the customer during the previous week. This command could allow the customer to add items to the weekly list, so that those items would not have to be entered on a weekly basis. As each UPC is scanned, the CIU responds with the normal information and also a reminder that the item is being added to the weekly automatic order list. |
| Delete Items from Automatic Weekly List | This command could allow a customer to delete from the weekly automatic order list. This command may work just like the 'Delete Items' command (FIGS. 6 and 8), except the CIU could remind the customer that the items are being deleted from the weekly automatic order list. |
| Cancel Automatic Weekly List for a Number of Days or Weeks | This command would allow a person going on vacation or away from home for a period of time to cancel an automatic delivery for a number of weeks or other specific period of time. For instance, someone leaving the area for the holidays or on vacation, will not want groceries delivered during that time. When this command is scanned, the CIU asks the customer to specify, using either a bar code or pressed keys on the phone, how many weeks or days to cancel the delivery. The CIU may then speak the dates and times of the cancelled delivery and ask for conformation from the customer. Upon confirmation, the deliveries would be cancelled. An alternative to the weekly order list is a list of items that could be added to the current order list by scanning one single bar code. The list could be maintained in the same manner as a weekly order list, but it would only be ordered when requested specifically. Therefore, it is never automatically ordered, but it does act as a time-saver for those who frequently use the service. |
| Request Contact from Store (personal call or connection operator) | This command would ring or display or otherwise make available to the merchant an indicator that a person using the service would like personal contact to answer questions or make a request. The indicator may be implemented using an audible or visual indicator, or the CIU could connect the user to another phone line that is answered by a person located at the merchant's place of business. It may be important that the user feel that a person is available in the event of an emergency or difficulty during the ordering process. |
| Enter Coupon | Coupons used in the grocery trade often have bar codes imprinted on a portion of the coupon. The information contained in the bar code may include the manufacturer, the items for which the coupon is valid, and the value of the coupon. Using this information, the CIU can automatically record the value of the coupon and the items for which it is valid when the consumer passes the bar code reader wand over the coupon bar code. The simplest way to enter a coupon, therefore, is to scan the identifying bar code on the coupon. In the absence of an identifying bar code, it is possible to enter the information in another way, using a command that will allow the customer to indicate the use of a coupon for a particular item. The customer scans the 'Enter Coupon' command, and then following |

| Command | Summary |
|---|---|
| | prompts by the CIU, enters the amount of the coupon's worth, perhaps scanning the code of the item that the coupon is for, and any other potinent information. The CIU may speak a reminder to the customer to check the expiration date of the coupon. When the groceries are delivered, the delivery person can also retrieve the coupons, and they may be compared to the order list when the delivery person returns to the merchantfs place of business. If the coupons are valid, the amounts on the coupons can be deducted from the customer's current bill. |
| Message of the Day | This command may repeat the welcome message (12, FIG. 5) received by the customer when the ordering process begins. It could also relay other important information to the customer. |
| Order a Meal or Dish | Another option that may be made available to the customer is the option to order all of the ingredients for a dish or meal by passing the bar code wand over one bar code. The CIU will respond by telling the customer what the meal or dish is, and repeating each item necessary for the meal over the phone. The customer can confirm each item, and as each item is confirmed, it could be added to the customer's grocery list. A customer would cancel items that were already available in the customer's home. For instance, the CIU might speak the following over the phone when the appropriate bar code was scanned" "You have requested the items constituting a Beans and Franks meal. Press or scan the number of people that will be eating the meal with you." The CIU would then wait to find out how many people will be eating the meal or dish to determine appropriate serving sizes. After the number of people are determined, the CIU confirms that number with the customer. Then the CIU continues: "The following items are necessary for the meal. Press 1 to confirm that you would like to order the item, or 2 to NOT order the item. B & M Baked Beans, $1.49. Press 1 to order this item, 2 to cancel this item." The CIU could then wait for an answer from the customer. The CIU would continue listing the items one at a time, until the entire list has been presented to the customer. Once the entire list has been offered to the customer, the CIU could repeat the items that have been ordered for the meal, and the items that the customer indicated were not needed in order to confirm to the customer what has and has not been ordered. |
| Reminder Call | This command could tell the CIU that the customer would like to receive a reminder call within a few hours of the scheduled delivery (or other appropriate length of time) as a reminder that the delivery will occur (or that the items need to be picked up, if the customer has asked to pick them up). The CIU will keep track of the customers who request this option and call them at the appropriate time. |
| Cancel Order | This command can cancel the present week's order, FIG. 6. No delivery would be made and no charge incurred by the customer for that week. The CIU would ask the customer to confirm that the order is to be cancelled, and when confirmed, would speak to the customer that such has been cancelled. |
| Confirm (place) order | This command finalizes and places the customer's order. When this command is scanned, the CIU may speak the total price, the delivery time and place, and other pertinent information and ask for confirmation from the customer. Upon confirmation, the CIU tells the customer that the order has been placed correctly. |
| Quit | This command (FIG. 6) indicates to the CIU that the ordering process for the customer is complete. The CIU asks for confirmation from the customer, and when confirmed, speaks a closing message 23 and hangs up the phone line 24, FIG. 4. At any other |

-continued

| Command | Summary |
|---------|---------|
| | time during the ordering process, if the CIU determines that the customer has hung up the phone, the CIU will also hang up to make that line available to other customers. |

The above commands constitute a list of useful commands for the illustrated and preferred application, and how they operate in a situation where a person wants to order goods from a merchant. Clearly, other commands are also possible.

The customer sets up a customization that determines what information is desired to be heard and in what order; and if any tones or codes are received during voice-back confirmation, such stops and ordering continues.

Turning, now, to more discussion of the data transmission encoding, FIG. 1, the reply voice generation from the merchant CIU, FIGS. 5, 6, 8 and 9, the bar code ordering catalog C, etc., the following further details of the preferred embodiment will be discussed.

Data Transmission Encoding

The preceding discussion has dealt with the transmission of information over the phone line. Although UPC codes are strictly numeric, many merchants track their inventory or services using alphanumeric codes. It is important, therefore, to allow flexibility for the possibility of sending more than just numeric information over the phone to the merchant.

Although only 16 DTMF tones are defined (0–9, *, #, A, B, C, D), it is possible to encode many more than 16 characters using DTMF tones. By using combinations of two or more DTMF tones in a row in a particular manner, it is possible to send as many different characters as are needed for a particular application.

The motivation for the following type of encoding is to reduce the amount of time spent transmitting information to the CIU. The information transmitted to the CIU will primarily be numbers (0–9) from UPC codes and the like. Numbers should thus be transmitted directly using the corresponding DTMF tones and not more than one DTMF tone. Characters, however, will also be transmitted frequently, although not as often as numbers, and it is also essential to reduce the number of tones sent indicating characters. The following encoding method shown in Table 1 allows all numbers (0–9) to be transmitted directly, and allows 60 additional characters, which could include all the uppercase and lowercase alphabetic characters and 8 other symbols, to be transmitted with only two tones each.

TABLE 1

Conversion table for converting between DTMF tone singles or pairs and their corresponding alphanumeric or symbolic representation.

| | | | | Prefix | | | |
|---|---|---|---|---|---|---|---|
| Number | none | A | B | C | D | * | # |
| 0 | 0 | A | K | U | a | k | u |
| 1 | 1 | B | L | V | b | l | v |
| 2 | 2 | C | M | W | c | m | w |
| 3 | 3 | D | N | X | d | n | x |
| 4 | 4 | E | O | Y | e | o | y |

TABLE 1-continued

Conversion table for converting between DTMF tone singles or pairs and their corresponding alphanumeric or symbolic representation.

| | | | | Prefix | | | |
|---|---|---|---|---|---|---|---|
| Number | none | A | B | C | D | * | # |
| 5 | 5 | F | P | Z | f | p | z |
| 6 | 6 | G | Q | — | g | q | / |
| 7 | 7 | H | R | . | h | r | + |
| 8 | 8 | I | S | <SPACE> | i | s | % |
| 9 | 9 | J | T | $ | j | t | * |

In this translation Table 1 for converting characters to their corresponding DTMF tones and pairs of tones, one locates the digit or character which is to be transmitted. Directly above the character is presented the prefix, which is the first tone to be sent. To the left of the character is listed the tone to be sent after the prefix. For instance, if one wanted to send the letter 'S" the two tones corresponding to 'B" and '8' would be used. The CIU would recognize the 'B' as a prefix tone and wait for the following tone to determine which of the 10 possible characters it represents (K–T). There is no prefix character for the numbers 0–9, and they are sent directly with the corresponding DTMF tone.

If more than 70 characters are required for transmission, the code could be continued by using three tones, e.g., 'a', 'a', '0' to indicate the 71st character, and so on. In fact, an infinite number of characters and symbols could be represented using a series of non-numeric characters (a, b, c, d, *, #) terminated by a digit. If a maximum of three DTMF tones were used to transmit characters, this would allow for a total of 430 different characters and symbols which is believed to be enough for most, if not all, applications. It should be noted, moreover, that the CIU and remote unit may easily be configured to use any desired encoding scheme, though the above has the benefit of reducing the number of tones relayed from the remote unit of the CIU, as before stated.

Voice generation

Voice generation by the merchant CIU (FIGS. 5, 6, 8 and 9) is accomplished using one of several available means, as before stated. Voice can be synthesized by combining bits of sounds called allophones into groups that make up a meaningful word to the listener. Several integrated circuits are commercially available that use this technique of voice synthesis.

Voice can also be generated by playing back previously recorded materials, either from an analog source, like a tape, or a digital source, like a compact disk read-only memory (CD-ROM) or a hard disk on a computer. In the preferred embodiment, a digital signal processor (DSP) on an add-in board in the CIU generates the voice signals by playing back previously recorded information stored on either a hard disk or a CD-ROM. The voice signals may be stored in either compressed or uncompressed format, although the compressed format reduces the storage requirements substantially. During playback, the voice signal data is retrieved from the storage unit and converted to the voice signals that are used to drive the phone line.

Phonemes and Allophones

In English, as in all languages (except, possibly, Esperanto), the spelling of words has no direct correspondence to the way they are pronounced. Each sound is represented by more than one letter or group of letters, and each letter can correspond to many sounds. Therefore, when talking about speech, it is necessary to discuss sounds instead of letters. Each sound in a language is referred to as a phoneme, and each language has a slightly different set of phonemes.

Although there are 44 phonemes in the English language, it is necessary to have more than 44 sounds when synthesizing speech. A phoneme may change slightly due to its position in a word. For instance, the final "k" sound in "trick" is usually not as loud as the "k" in "kite". Because phonemes are slightly different depending on their position in a word, phonemes are further broken down into allophones. Allophones are a larger collection of sounds that take positional variations of phonemes into account.

There are methods (software algorithms) currently available for converting text stored on a computer to allophones or allophone codes. This can be done electronically using a microprocessor with the algorithms embedded, or it may be done using a subroutine running on a more generic computer. If each allophone is stored as a voice file on a hard disk or CD-ROM, it would be possible to speak most words without having to generate the voice file for each individual word. Thus, it is also possible to provide voice feedback not just by playing back previously digitally recorded voice files containing words and phrases, but also be playing back allophones in the correct sequence to reconstruct words. The order in which the allophones are played back may be determined using a text to allophone conversion routine.

Any of the above processes may be used for generating the speech that is transmitted over the phone as feedback to the user of the remote data access device described herein.

It is also possible to use some of the above voice synthesis and playback techniques in the remote user telephone unit. Although the cost of the user remote unit would increase if the voice feedback were incorporated directly into its electronics, it may be desirable to send information back and forth to the CIU digitally and to generate the voice feedback at the remote location, instead of sending it from the CIU directly over the phone line.

Catalog

To allow someone to send information to the CIU, commands and items must be printed in a machine readable format. Although striped bar codes, including UPC, Code 39 and other formats, are frequently used, any machine readable format utilizing visible, magnetic, or other recording or printing technique could be used for decoding and sending commands and other information to the CIU. The only requirement for the encoding technique is that it be possible for a person to place the code in the proximity of the reader in a manner or using a technique that could allow the reader to interpret the encoded message. For example, in the event that printed bar codes are used, it is necessary for a person using the remote device to be able to place a bar code wand near the bar code and place the wand on or move the wand across the code in a way that the bar code decoder will be able to understand the information in the bar code.

It is convenient for a person using the remote device to have access to at least three items containing encoded information. The person could have a bar code or other machine-readable code that contains identification information specific to that person, in the case where it is important that the CIU recognize who is connected to the CIU. As before stated, a password may also be encoded for that person if necessary. The person using the device may also have an encoded (printed, or otherwise) list of commands that are appropriate for communication with the CIU. The third item that the person may have is a list of successive items, accompanied by their encoded representations that may be ordered or requested from the merchant and are recognizable by the CIU.

The encoded information may be printed in flyers, newspapers, catalogs, or any other format that is appropriate and convenient for encoding the information and distributing said information to users of the remote device. A typical catalog might have the commands and item codes printed in a manner that allows a person using the remote device easily to find items that will be requested from the merchant and the commands necessary to complete a transaction.

There are also, as previously discussed, other places where encoded information may be placed, including stickers on products received from the merchant. When the item is used up, the person using the remote terminal may remove the sticker from the item and put it in a convenient place (ordering list) to be scanned in during the next session with the CIU.

When a person receives the merchandise or service, the invoice or receipt for the items should also include the code for the merchandise or services received in order to facilitate reordering. For instance, a receipt from a grocery store might include a list of the items ordered, the price of each item, and the code (UPC in this case) for use with the remote terminal for reordering the same item for subsequent deliveries.

In a practical implementation of the systems of FIGS. 1 and 2B, many of the following components have been successfully used:

Microprocessor M: 80C31 (or 8051 family) from Intel Corporation;

ROM: Advanced Micro Devices 27C64-120 eprom;

DTMF Generator: National Semiconductor TP5808 DTMF generator;

Computer C': ZEOS 386sx-16;

Voice Response Board: Rhetorex RDSP Board;

Hard Drive: Conner or Seagate;

Modem/FAX board: Intel SatisFAXion board;

Display and Display Electronics: NEC or Hercules displays; ATI or Hercules adapters, etc.

CD-ROM drives: Toshiba; NEC;

Tape Backup Equipment: Tecmar, Tallgrass, GCC Technologies and corresponding software;

Printers: HP Laserjet series printers;

Bar Code Wands: HP HEDS-3000 wands, or Intermec wands.

While, as before stated, other types of machine readable format than optical bar code techniques may be employed including magnetic stripes, rotary and other codes, they all operate so far as the present invention is concerned in precisely the same way as the linear stripe bar code and are intended to be embraced herein within the meaning of the term "bar code", with the "reader" assuming the appropriate sensor form of a scanning wand or other reader including CCD arrays, etc.—again all performing the same function in the same way to get the same result as in the system of the invention. Similarly, if voice response is to be supplemented by LCD display as in ISDN systems, this may also be incorporated, if desired, as may facsimile (FAX)-back services as before mentioned.

Further modifications will also occur to those skilled in this art and such are considered to fall within the spirit and scope of the invention as defined in the appended claims.

What is claimed is:

1. A system for remote, real-time ordering on a user telephone terminal items of merchandise or services from a provider of such items via a central telephone terminal, comprising:

bar code reader means at the user terminal for machine reading bar codes selectively scanned by the user from a pre-provided catalog containing bar codes corresponding to such items and bar codes corresponding to a predetermined plurality of commands for controlling the central terminal;

transmitting means at the user terminal for successively transmitting to the central terminal item orders and commands corresponding to selected bar codes scanned by the user while the user terminal is on-line with the central terminal, said transmitting means directly, in real time, converting signals resulting from the machine reading of the selected bar codes to DTMF signals and transmitting the DTMF signals to the central terminal over a telephone line; and receiving and processing means at the central terminal for receiving and processing item orders and commands successively transmitted by the transmitting means, each in accordance with the user's freely discretionary selections made while the user terminal is on-line with the central terminal, among the items and said predetermined plurality of commands from the catalog, said receiving and processing means automatically recognizing whether each transmission is an item order or a command and, when an item order is recognized, automatically storing the same, generating a corresponding confirmatory voice response describing the ordered item and sending the voice response over the telephone line back to the user terminal, and, when a command is recognized, automatically executing the command.

2. A system according to claim 1, further including means at the central terminal for supplementing the voice responses with additional information regarding the ordered items in response to a received command requesting such information.

3. A system according to claim 1, wherein means is provided at the central terminal for automatically responding to received commands for at least one of the purposes of special informational requests, deletion and quantity changes of ordered items, cost and cost total information of ordered items, scheduling of ordered item-pickup or delivery, visual display at the user terminal of ordered item descriptions, and facsimile transmission of a list of ordered items to the user.

4. A system according to claim 3, including means for enabling the user to transmit additional commands to the central terminal by at least one of user telephone terminal keyboard entry and voice.

5. A system according to claim 1, wherein said bar code reader means is connected with microprocessor means controlling a DTMF converting means for the DTMF conversion.

6. A system according to claim 5, wherein said microprocessor means includes microprocessor input connected to receive the read bar code signals directly from said bar code reader means, and means for analyzing the read bar code signals, generating corresponding ASCII code, and storing the same.

7. A system according to claim 1, wherein components at the user terminal receive power from the telephone line.

8. A system according to claim 1, wherein means is provided at the user terminal for generating an audible confirmation of successful DTMF conversion.

\* \* \* \* \*